United States Patent
Rohagti

[19]

[11] Patent Number: 6,099,063

[45] Date of Patent: Aug. 8, 2000

[54] DEVICE AND METHOD FOR POSITIONING WINDSHIELD GLASS

[75] Inventor: Dipak X. Rohagti, Fort Wayne, Ind.

[73] Assignee: Navistar International Transportation Corp.

[21] Appl. No.: 09/272,662

[22] Filed: Mar. 18, 1999

Related U.S. Application Data

[60] Provisional application No. 60/122,659, Mar. 3, 1999.

[51] Int. Cl.[7] ....................................................... B60J 1/00
[52] U.S. Cl. .................... 296/84.1; 296/96.21; 296/201
[58] Field of Search ................................ 296/84.1, 96.21, 296/201, 196.15; 52/764, 763, 762, 204.84

[56] References Cited

U.S. PATENT DOCUMENTS

| | | | |
|---|---|---|---|
| 4,765,672 | 8/1988 | Weaver | 296/84.1 |
| 5,308,135 | 5/1994 | Stedman | 296/96.21 |
| 5,956,833 | 9/1999 | Davis et al. | 296/96.21 X |

FOREIGN PATENT DOCUMENTS

| | | | |
|---|---|---|---|
| 3410697 | 7/1985 | Germany | 296/84.1 |

*Primary Examiner*—D. Glenn Dayoan
*Assistant Examiner*—Jason Morrow
*Attorney, Agent, or Firm*—Jeffrey P. Calfa; Dennis Kelly Sullivan; Neil T. Powell

[57] ABSTRACT

The invention relates to positioning and installing a windshield within a vehicle frame. An installer places a windshield within the vehicle frame and aligns the windshield using a dart to position and engage the windshield within the windshield opening. The dart nay engage a dart-receiving slot located in the windshield's trim piece. The installer aligns the dart-receiving slot with the dart, then adjusts the position of the windshield as needed.

19 Claims, 3 Drawing Sheets

DEVICE AND METHOD FOR POSITIONING WINDSHIELD GLASS

RELATED APPLICATIONS

This application claims the benefit of U.S. Provisional Application Ser. No. 60/122,659, filed Mar. 3, 1999 which application is incorporated herein in its entirety.

BACKGROUND OF THE INVENTION

1. Field of the Invention

The present invention relates to a device and method to accurately locate and position an encapsulated windshield in a vehicle.

2. Description of the Prior Art

Aerodynamic requirements for cars, trucks and other vehicles greatly influence their outside appearance. This aerodynamic influence is seen in the design of the windshield and the vehicle body, such as streamlining. The method of mounting windshield glass to a vehicle body affects the outside appearance and consequently, these aerodynamic requirements.

For trucks, the nature of the manufacturing process and tolerance stacking lead to a large number of cab build variations in the frame. For aesthetic reasons, it is necessary to hide these imperfections when installing the windshield.

One recent advance for windshield installation involves encapsulated windshields. Glass encapsulation molds a plastic trim piece, such as polyvinyl chloride, onto the periphery of the glass. The plastic trim piece fills the gap between the windshield glass and the vehicle body. The trim piece is injection molded after placing the windshield glass into the mold.

Although expensive, encapsulation provides a single unit for installation with excellent dimensional tolerances along the perimeter of the assembly. Encapsulation may also provide glass locating identification marks, mounting tabs, spacer blocks and exterior lip-type seals.

During vehicle assembly, the windshield is coated along its edges with an adhesive, frequently by a robot. The windshield is placed into the windshield opening of the vehicle frame and aligned. After insertion and alignment, the vehicle moves along the assembly line while the adhesive bonds the windshield to the vehicle, generally after several hours.

The encapsulated windshield must be accurately located and positioned both horizontally and vertically within the windshield opening, especially for an automated bond-in process. Tolerances for placement are very small. Therefore, accurately positioning the encapsulated windshield is critical because it affects both the fit and finish of the vehicle, as well as the quality of the bond. Without proper fit and bonding, air and water can leak into the vehicle.

Quickly mounting the windshield during production is equally important. The faster and more accurately the windshield is mounted, the less labor time is required. Therefore, the glass should be mounted without requiring lengthy adjustments. Trimming the vehicle or windshield and calculating the amount of adjustment to fit the windshield increase labor time, worker stress and the chance for error during production.

During assembly, the worker has a limited time to insert the windshield into the vehicle frame. Steps that require additional labor and calculations, especially sophisticated calculations, during production make it more difficult to economically and effectively install windshields. The additional time spent calculating variances and correcting for minor imperfections slows the assembly line. The greater number of calculations also increases the chance of introducing additional errors from miscalculation.

Furthermore, replacing windshields after assembly is difficult. Not only do the same problems exist with accurately positioning and installing the windshield, but the replacement windshields must incorporate the molded perimeter without changing the frame.

A prior method of installing a windshield uses three long, flat rectangular tabs (about 3 inches long) extending from a riveted metal bracket with an attached layer of plastic, such as sheet molding compound, forming the edge of the vehicle frame. One tab is located toward each side and the third is located in the middle. The windshield trim piece has a corresponding recess that matingly engages the tab.

Because the interlocking tabs and recesses prevent the worker from adjusting the fit by simply repositioning the window, correcting minor errors in fitting requires raising the windshield the full height of the tab or altering the tab or trim piece, such as by filing or shaving, to fit the windshield. The worker cannot simply shim the windshield, because there is no good location to place a shim. Raising the windshield to clear the tabs would increase the spring force generated from the trim piece compressed against the frame, leading to possible uneven bond or leaks in the cab. Because the tabs do not allow a gradual increase in trim coverage, the additional coverage at the top may be more than what is necessary, resulting in a poor finish.

The amount of tab or trim piece removed by this method is determined by trial and error and is time consuming. The alteration of the tab or trim piece must also be even and exact, or else the alteration itself will introduce error to the installation process. The worker must then calculate the amount of material filed away, adjust the position of the windshield to fit, modify the amount of adhesive and decide whether additional means are required to keep the windshield in place during bonding.

All of these additional steps to correct error are inefficient and costly. Cabs and windshields with slight imperfections may be rejected because they cannot be accurately installed. Because the cabs and windshields are expensive, this rejection is an expensive waste. Alternatively, correcting the slight imperfections may require these correction steps to be performed off the assembly line which also adds to the cost. Applying a plastic layer to the edge of the vehicle frame introduces an additional manufacturing step, further increasing the cost. Moreover, the tab design makes it extremely difficult to install a replacement windshield aftermarket.

Other methods use windshield markings to align the windshield. Although simple, the windshield is difficult to accurately position and maintain the position during assembly and bonding. Another method aligns windshield markings with a shallow notch within the frame. There is, however, no way of positively locking the windshield in position with these methods.

Therefore, one object of the invention is to design a frame and windshield that can be easily adjusted for minor errors. Another object is to properly and quickly position a windshield within a vehicle frame which requires minimum adjustments and calculations to correct for any error. Another object of the invention is to allow the method to serve as a quality control indicator for the frame itself. Still another object of the invention is to produce a frame where a replacement windshield easily installs.

SUMMARY OF INVENTION

The design and method of the invention are used to position and install a windshield within a vehicle frame, usually within a windshield opening bordered by the frame. After placing the windshield within the frame, the installer aligns the windshield with a dart for positioning and engaging the windshield within the windshield opening. The installer uses the dart to matingly engage dart-engaging means the windshield's trim piece. Typically, the installer aligns a dart-receiving slot within the trim piece with a vertically aligned dart at the edge of the bottom side of the frame, then adjusts the position of the windshield as needed.

Additional effects, features and advantages will be apparent in the written description that follows.

DRAWINGS

DETAILS OF INVENTION

Figure 1:
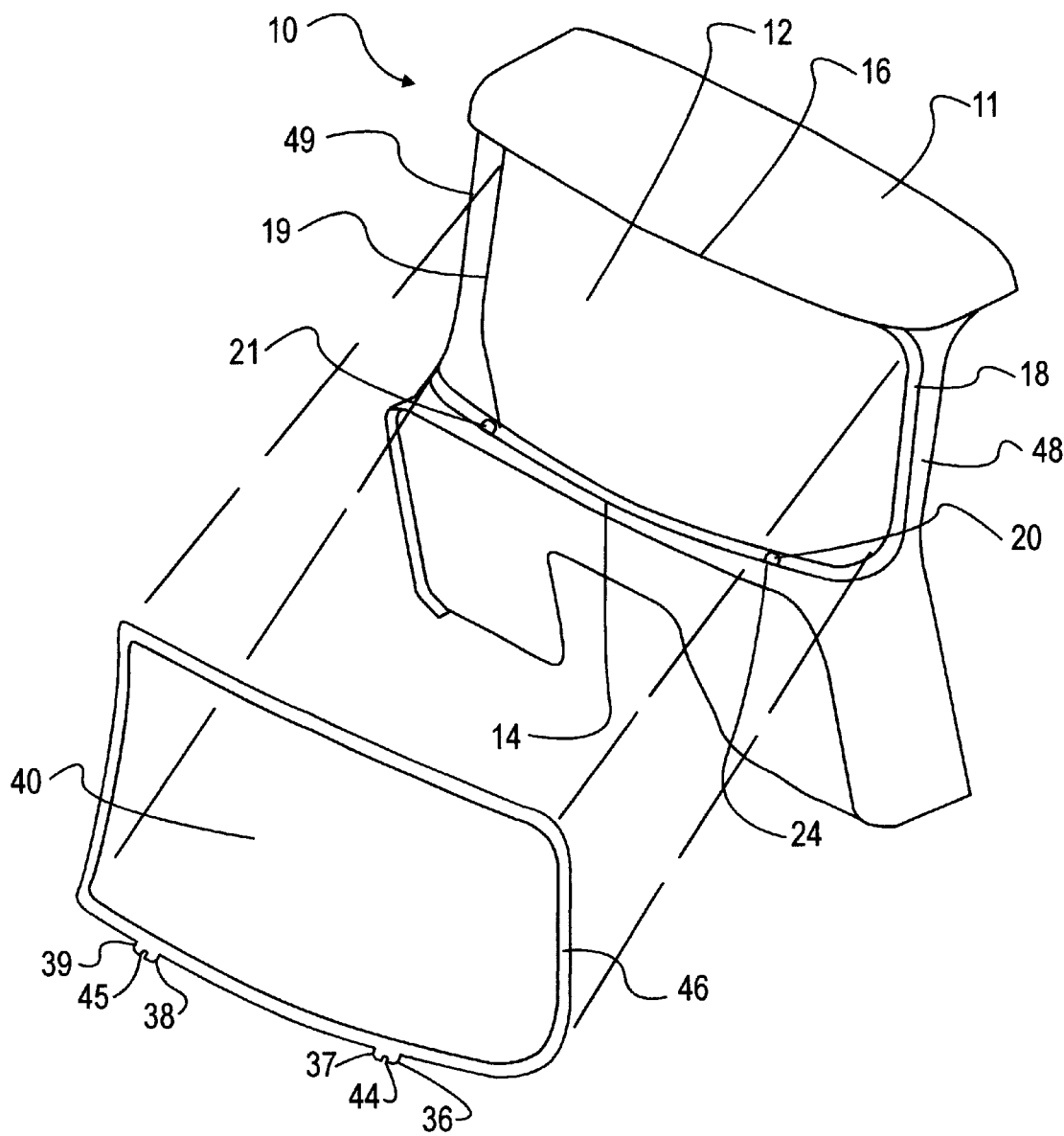
FIG. 1 is an exploded perspective view of a one windshield vehicle frame and windshield of the invention.

Turning to the Figures, several aspects of the invention are shown with like numbers referring to like features. FIG. 1 shows a one windshield vehicle, such as a truck cab 10 having a frame 11 with a windshield opening 12 bordered by frame sides 14, 16, 18, 19.

Figure 2:
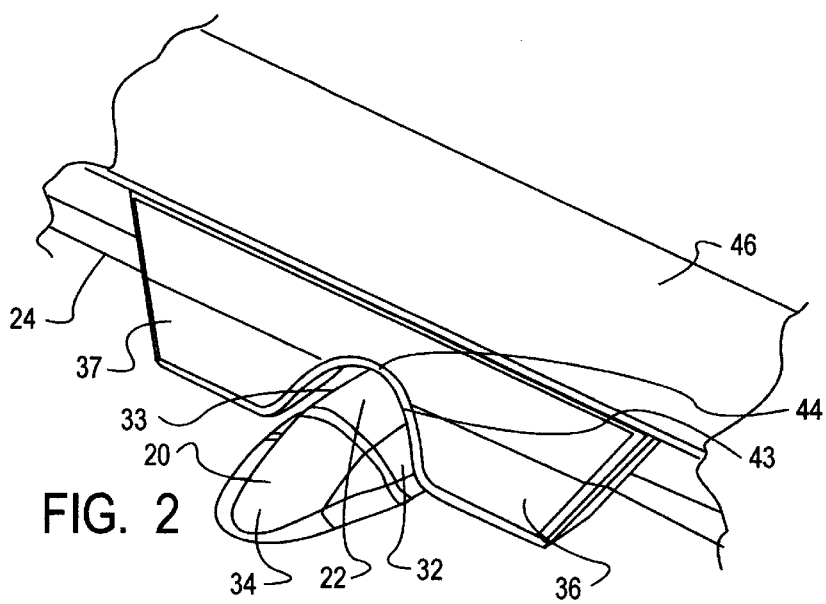
FIG. 2 is a perspective view of one device of the invention.
Figure 3:
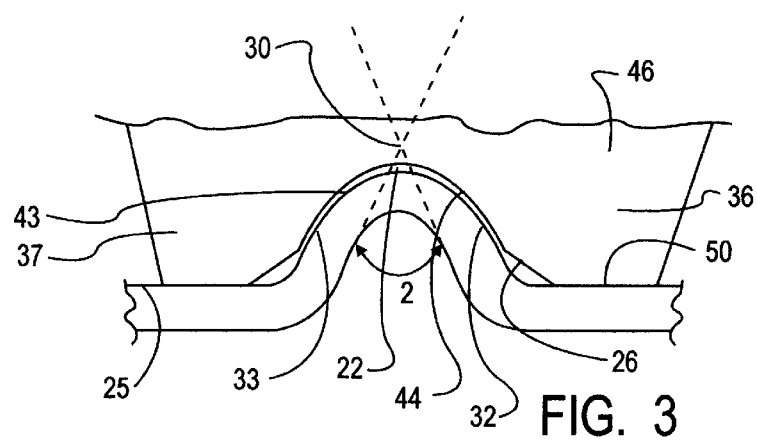
FIG. 3 is a cross-sectional view of a device of the invention.

In the preferred embodiment, vertically aligned darts 20, 21 extend upwardly into the windshield opening 12 from the bottom frame edge 14. Darts 20, 21 are located outward toward the side of the vehicle adjacent frame sides 18, 19. Turning to FIGS. 2 and 3, each dart has a peak 22 at the edge 24 of bottom frame side 14. The proximal dart sides 32, 33 steeply rise from the bottom side floor 25 along edge 24 toward peak 22. Distal from the edge, distal dart side 34 of dart 22 can gradually rise toward peak 22. The darts can be made during frame manufacturing by stamping for a metal frame or molding for a plastic frame, such as a fiberglass frame.

Figure 4:
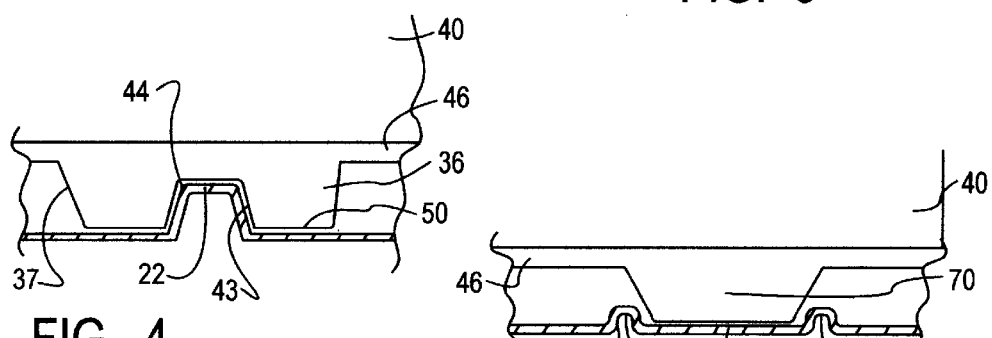
FIG. 4 is a cross-sectional view of another device of the invention.

Dart 20 should positively lock a windshield 40 when placed within a dart-receiving slot 44 in the windshield 40. When angle 2 of peak 22 as measured from apex 30 increases, the slope of proximal dart sides 32, 33 decreases. Larger angles widen the peak and can prevent the dart from positively locking within the dart-receiving slot. As angle 2 decreases, below about 70° for example, the slope of sides 32, 33 increases and dart 20 can positively lock within dart-receiving slot 44. If angle 2 becomes too small, however, the material forming the dart, for example sheet metal, may crack during dart formation. Thus, a V-shaped or U-shaped dart in cross-section is preferable as shown in FIGS. 3 and 4 respectively, with the V-shaped dart with angle 2 ranging from about 20° to about 70° currently more preferable due to its easier formation during manufacturing.

Windshield 40 has at least one dart-receiving slot 44 defined by a slot wall 43 in its lower portion 42. Slot wall 43 of dart-receiving slot 44 conforms to the shape of dart 20, such as a V-shaped slot shown in FIG. 3 or a U-shaped slot shown in FIG. 4. Part of slot wall 43 can curve or angle toward the floor 25 (FIG. 3). Dart-receiving slot 44 can be molded in the trim piece 46 during encapsulation. Preferably, dart-receiving slot 44 is further defined by spaced apart legs 36, 37 that extend from trim piece 46. The base of leg 50 can be straight. For vehicles with one windshield, the windshield preferably has at least one dart-receiving slot on each side of the lower part of the windshield corresponding to the darts.

In the preferred method of the invention, dart-receiving slots 44, 45 of legs 36, 37, 38, 39 fit onto darts 20, 21. The dart-receiving slot of the legs and the dart are designed to mate with a nominal design clearance. This accurately positions the windshield glass horizontally and the length of the legs, which rests on the floor on the frame, positions it vertically.

Figure 5:
FIG. 5 is a cross-sectional view of another device of the invention.

For truck cabs, the windshield encapsulation trim piece covers the gap between the glass and the frame, as well as hides any vehicle imperfections. The nominal design clearance between slot wall 43 with dart 20 allowing the windshield to be moved without shimming is about 1.8 mm (0.07 in.) as shown in FIGS. 3, 4 and 5. To accommodate imperfections, the windshield could be moved as much as about 1.8 mm (0.07 in.) sideways from the design nominal. The design clearance also provides a reasonable spring force or interference fit to keep the windshield trim piece tight against the vehicle frame.

The encapsulated windshield trim piece 46 covers the A-pillars 48, 49 on sides 18, 19 and the roof line at the top frame side 18 by about 9.525 mm (⅜ in.) with about a 2 mm interference fit at nominal design. This hides the gap between the bonded glass and A-pillar on the sides and the roof at the top and enhances its aesthetic appearance. The interference fit provides a spring force which is formed by compressing the trim piece against the frame so that the encapsulated windshield trim stays tight against the metal. This spring force should be large enough so that the trim piece stays tight against the frame, however, not too large to spring the windshield away from the frame during the initial set-in time. Moving the glass in any direction beyond the design nominal to hide frame imperfections increases the spring force on that side and decreases the spring force on the other side. This uneven spring force of the trim on the glass could result in poor bonding, leaking and a poor appearance. Because the two forces need to be balanced during the installation process, it is important that the smallest deviation from the nominal be used to hide cab imperfections. With this method, however, the installer knows when additional means of holding the glass is necessary during the bond set-in time.

If the nominal design tolerance insufficiently hides the cab imperfections either on the top or on the sides, the encapsulated windshield can be adjusted by gradually raising the legs by sliding a shim piece between the base of the leg and the frame, preferably in about 1 mm steps. This would increase the roof line coverage from the nominal by the thickness of the shim piece. Since the dart-receiving slots and the darts mate, raising the legs by a small amount increases the clearance between the two. The increased clearance allows the encapsulated windshield to move horizontally to either side for a higher level of adjustment to accommodate larger frame variations. As the windshield is raised vertically by shimming, it increases the permissible side adjustment by a fixed ratio defined by the distance from the walls of the slot to the dart peak and increases as the legs are raised. If only the vertical coverage needs to be increased, the installer gradually raises the legs vertically by shimming in steps of about 1 mm. Then the installer simply aligns the dart-receiving slot with the dart and drops the windshield for bonding.

If horizontal adjustment is needed, the installer raises the legs by gradual shimming as described above. The installer can then move the windshield horizontally, such as about 1 mm steps. Each vertical shimming step gives the installer more latitude for horizontal adjustment to misalign the dart-receiving slot from the dart to fit the windshield into the opening.

The process of gradual shimming coupled with the amount of misalignment can indicate the quality of the vehicle frame and when additional means of holding the windshield in place are necessary to counteract the spring force while the adhesive bond sets. For example, after vertically adjusting with three shims (legs raised 3 mm) and no side adjustment, to counteract the spring force of the trim, the installer may provide additional means of holding the glass in place only at the top while the adhesive bond sets. If the installer also needs to move the windshield horizontally to increase trim coverage from the nominal, by raising the windshield with 3 mm shims and moving the windshield by 1 mm to one side, the amount of misalignment signals that the windshield must be pressed onto the cab at the roof line and on the sides by additional force to counteract the spring-back force of the trim piece. If more than 6 mm shims are needed to hide frame imperfections, the spring force of the trim could be too high to properly install the windshield and the cab can be rejected as out of control build.

Figure 6:
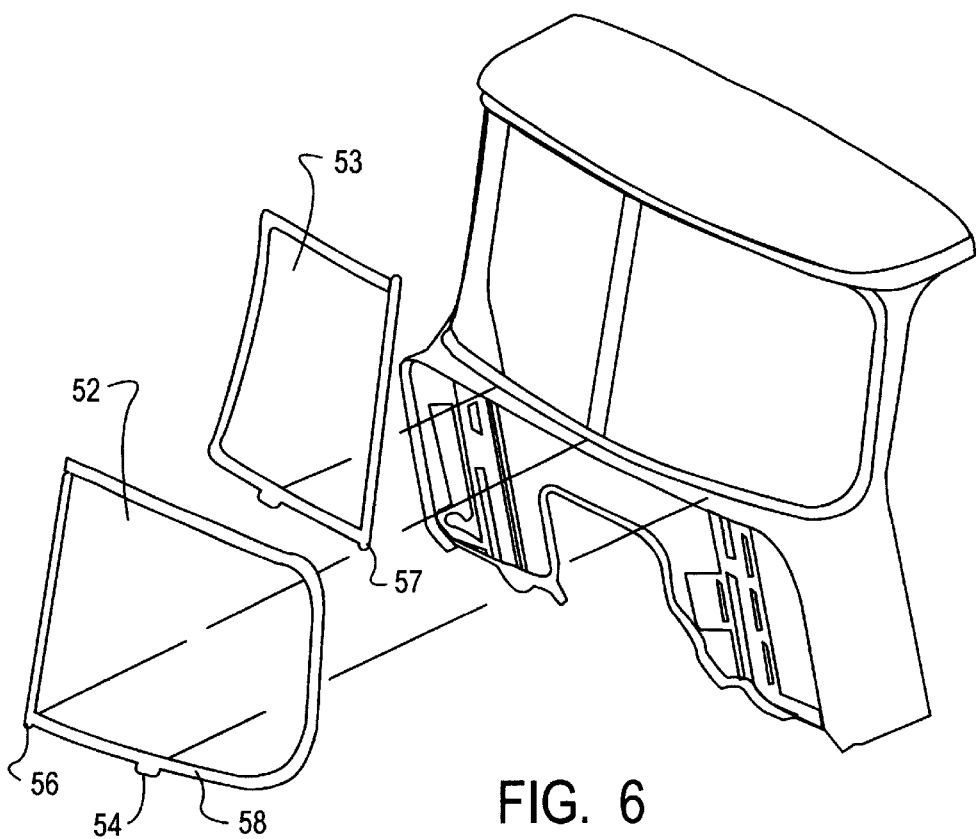
FIG. 6 is an exploded perspective view of a two windshield vehicle frame and windshield of the invention.
Figure 7:
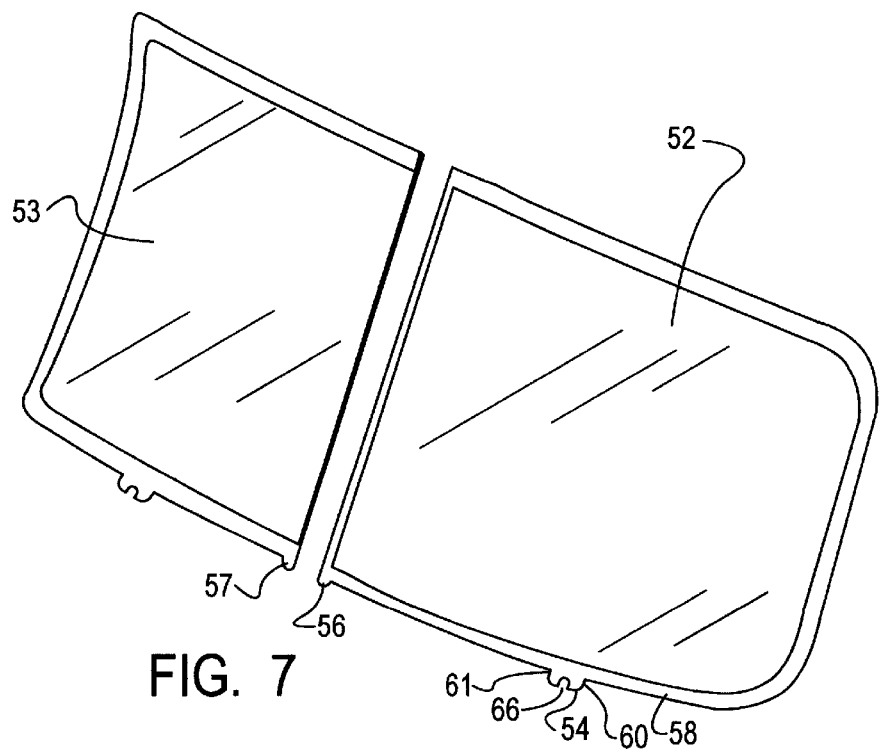
FIG. 7 is a perspective view of two windshields from FIG. 6.

Turning to FIG. 6 for a vehicle frame for two windshields, 52,53 each windshield preferably has at least one dart-receiving slot 54 on the lower edge 58 of the windshield 52 and a straight leg 56 at the lower edge 58. Preferably, the dart receiving slot is formed from slot wall 66 and legs 60,61. Each windshield 52,53 has at least one dart receiving slot like 54 on windshield 52 and one straight leg 57 on windshield 52 with no slot. The thus formed dart-receiving slot locks the windshield in position and the straight leg 56 at the edge of the half-windshield 52 prevents the windshield 52 rotation during installation and adhesive bonding.

It should be apparent to those skilled in the art, that the dart described above can be made in the encapsulated glass with a dart-receiving slot made in the edge of the vehicle frame of the cab.

Alternatively, FIG. 5 shows two closely spaced darts 72, 73. Each closely-spaced dart has a peak 22 at the edge 24 of bottom frame side 14. The closely-spaced darts 72, 73 form a trim dart-receiving slot 74 to engage or positively lock a trim dart 70. Any vertical and horizontal adjustments of the windshield can be made as described above by shimming the trim dart.

The design and method of the invention make it easy to accurately install a windshield into the frame of a vehicle. The use of dart-receiving slots and darts allows the windshield to be accurately located and positioned by a worker, robot or strong-arm before it is dropped on the frame for adhesive bonding. When required, the assembly line worker can easily adjust the windshield position for frame imperfections by simply shimming and moving the windshield beyond nominal. This simple adjustment requires neither lengthy calculations nor worker time to accurately position the windshield, thus eliminating the introduction of potential errors.

The design and method of the invention are economical. Additional manufacturing steps are not required. The dart is made in the frame during frame manufacturing, such as stamped in a die. Likewise, the dart-receiving slot is molded along with the trim piece during windshield manufacturing. Building these pieces during regular manufacturing allows the design to hold tight tolerances which reduces the rejection of vehicle frames and windshields due to minor imperfections.

The design and method of the invention do not require the use of labor-intensive fixtures on the vehicle to install a windshield. Because of the precise method of manufacturing, most windshields can be inserted right into the vehicle frame. The trim piece spring force should sufficiently hold the windshield tightly against the frame during adhesive bonding, thus eliminating a need for fixtures to hold the windshield in place during bonding. This ensures a consistent quality bond between the windshield and the frame.

The designs and method of the invention are versatile. They can be used for both manual and automated installation processes. In addition, because the dart remains in place, it is easy to replace a windshield aftermarket by simply aligning the dart-receiving slots in the windshield trim piece with the darts.

While the invention is shown in only one of its forms, it is not thus limited but is susceptible to various changes and modifications without departing from the spirit and scope of the invention.

We claim:

1. A vehicle frame comprising:
   (a) a windshield opening bounded by the frame;
   (b) a dart for positioning and engaging a windshield within the windshield opening, the dart being located on a frame edge along a bottom portion of the windshield opening and extending upwardly into the windshield opening;
   (c) the windshield comprising a trim piece and glass; and;
   (d) means for engaging the dart being located in the trim piece.

2. A vehicle frame of claim 1, wherein the means for engaging the dart comprises a dart-receiving slot shaped to conform to the shape of the dart.

3. A vehicle frame of claim 2, wherein the dart-receiving slot is defined by spaced apart legs extending from the trim piece.

4. A vehicle frame of claim 1, wherein the means for engaging the dart comprises a trim dart.

5. The vehicle frame of claim 1 wherein the dart has a peak and sloping sides.

6. The vehicle frame of claim 5, wherein the cross-section of the dart is U-shaped or V-shaped.

7. A vehicle frame comprising:
   (a) a windshield opening bounded by the frame;
   (b) a vertically aligned dart for positioning and engaging a windshield within the windshield opening, the vertically aligned dart being located on a frame edge along a bottom portion of the windshield opening;
   (c) the windshield comprising a trim piece and glass; and
   (d) means for engaging the vertically aligned dart located in the trim piece.

8. A vehicle frame of claim 7, wherein the dart has a peak and sloping sides.

9. A vehicle frame of claim 8, wherein the cross-section of the dart is U-shaped or V-shaped.

10. A vehicle frame of claim 7, wherein the means for engaging the vertically aligned dart comprises a trim dart.

11. A vehicle of frame of claim 10, further comprising:
   (a) a trim dart-receiving slot; and
   (b) a second vertically aligned dart located close to the first vertically aligned dart on the frame edge to form the trim dart-receiving slot.

12. A method of installing a windshield within a vehicle frame comprising the steps of:
   (a) providing a vertically aligned dart for positioning and engaging a windshield within the windshield opening, the vertically aligned dart being located on a frame edge along the windshield opening;
   (b) matingly engaging dart-engaging means located in a trim piece of the windshield with the vertically aligned dart;
   (c) aligning the windshield within the windshield frame;
   (d) making any adjustments to alignment;
   (e) bonding the windshield to the frame.

13. The method of claim 12, wherein the dart extends upwardly into the windshield opening.

14. A method of claim 13, wherein the dart has a peak and sloping sides.

15. A method of claim 14, wherein the cross-section of the dart is U-shaped or V-shaped.

16. A method of claim 13, wherein the dart-engaging means comprises a dart-receiving slot shaped to conform to the shape of the dart.

17. A method of claim 16, wherein the dart-receiving slot is defined by spaced apart legs extending from the trim piece.

18. A method of claim 12, wherein the dart-engaging means comprises a trim dart.

19. A vehicle frame of claim 18, further comprising the step of:
   (a) providing a second vertically aligned dart located close to the first vertically aligned dart on the frame edge in order to matingly engage the trim dart between the two vertically aligned darts.

* * * * *